Oct. 27, 1931.  A. G. LOBLEY  1,829,416
CONTROL OF TEMPERATURE IN ELECTRIC FURNACES AND THE LIKE
Filed Sept. 22, 1926  2 Sheets-Sheet 1

INVENTOR

Oct. 27, 1931.  A. G. LOBLEY  1,829,416
CONTROL OF TEMPERATURE IN ELECTRIC FURNACES AND THE LIKE
Filed Sept. 22, 1926  2 Sheets-Sheet 2

INVENTOR

Patented Oct. 27, 1931

1,829,416

UNITED STATES PATENT OFFICE

ALFRED GLYNNE LOBLEY, OF CHAPEL-EN-LE-FRITH, ENGLAND, ASSIGNOR OF ONE-HALF TO BIRMINGHAM ELECTRIC FURNACES LIMITED, OF ERDINGTON, BIRMINGHAM, ENGLAND

CONTROL OF TEMPERATURE IN ELECTRIC FURNACES AND THE LIKE

Application filed September 22, 1926, Serial No. 136,963, and in Great Britain October 1, 1925.

This invention has reference to systems or installations for controlling the temperature of electric furnaces, muffles and the like in which the supply of furnace current is automatically controlled by a thermostatically operated switch in relay with an electro-magnetic or clapper switch that governs the furnace supply circuit; the system being adapted to provide for the automatically breaking of the supply circuit if and when a certain or predetermined furnace temperature is exceeded and for the closing of such circuit when the furnace cools down below such temperature.

The present invention proposes to provide an improved system or installation of the above-mentioned kind which, whilst being highly sensitive and accurate in its operations, is robust and simple in construction and is adapted for commercial use in connection with high-temperature electric furnaces in that the apparatus employed either eliminates, or compensates for, the effects of high-temperature working conditions and sources of error.

According to the said invention, the temperature control system comprises a switch of the quick-break and quick-make type that embodies a trip-operating lever which is adapted to be displaced by a thermostat element in the "break" direction when a predetermined furnace temperature is exceeded, and is permitted, by the said thermostat element, to be automatically displaced in the "make" direction (when the furnace cools below a predetermined temperature) by a spring embodied in the switch mechanism. Such a quick-make and quick-break switch can advantageously be embodied in a relay-circuit carrying the full voltage of the current supplied to the main or working circuit of the furnace.

Further in accordance with the said invention, a switch such as above referred to is associated with a thermostat comprising an active element which is made of material having a high co-efficient of expansion and is fixed or mechanically connected, outside the furnace, to a displaceable switch-controlling member whereas the part that extends into the furnace is not definitely or actually fixed or anchored but is maintained in abutment with a locating element (made of material having a low or negligible expansion co-efficient) by loading springs which are so applied as to maintain the high-expansion element in tension and the low-expansion element in compression both when the displacement of the switch-lever is being effected consequent on expansion of the said tensioned element and when its contraction is taking the thermostat effort off the said switch-lever to permit of the actuation of the latter by the switch-spring.

Referring to the accompanying drawings, in which:

Fig. 3 is a side elevation of a modified form of thermostat.

The switch comprises a lever $a$ pivoted at $a'$, and having a short heel or tooth $a^2$ at one side of the pivot, which is engaged by a contact-stud carried by the high-expansion element of the thermostat. The end of the lever $a$ at the other side of the pivot is relatively long, whereby the movement originating in the thermostat and which is transmitted to the snap switch is considerably multiplied.

Figure 2:
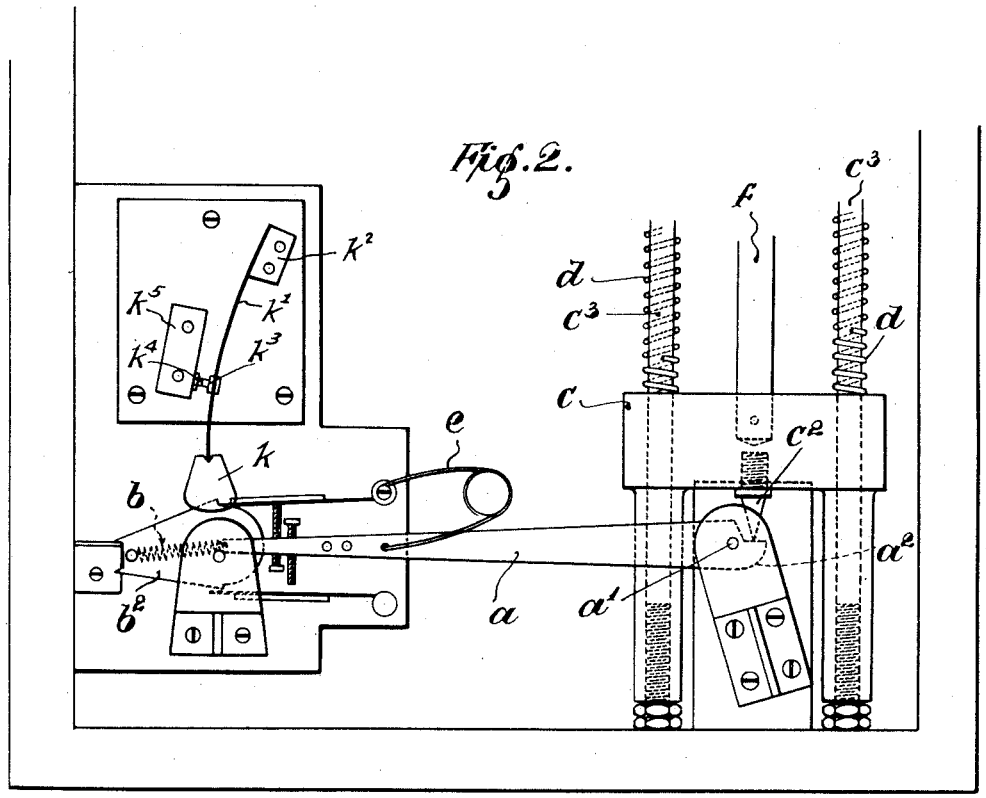
Fig. 2 is a side elevation of the switch mechanism shown in Fig. 1 on a larger scale.

The outer end of the long portion of lever $a$ is connected by means of a spring $b$ to a pivoted trip-member $b^2$, and $e$ is a spring arranged to move the long end of the lever $a$ in the reverse direction from the movement imparted to the lever by the thermostat, or in a counter clock-wise direction. This long end of the lever $a$ is also provided with two contact screws, which are arranged to engage spaced, pivoted catch members adapted to engage detents on the trip-member, the upper catch member being in engagement with its detent, so that the trip-member $b^2$ is restrained against movement in a clock-wise direction by the tension of spring $b$ as shown in Fig. 2. One of the screws on lever $a$ is in contact with its trip and by a slight clockwise movement of lever $a$, by means of the thermostat, the upper catch will be moved out of its detent and spring $b$ will then snap the trip-member $b^2$ in a clock-wise direction. The movement in the opposite direction is effected by spring $e$ and the lower catch when the thermostat contracts sufficiently to permit the spring $e$ to function.

Connected to the trip member $b^2$ is block of nonconducting material $k$ which extends upwardly therefrom and is provided with a notch in its upper edge. $k'$ is a spring blade extending from a fixed terminal $k^2$, the lower end of the blade being seated in the notch in the block $k$. The blade carries a contact $k^3$, which engages a contact $k^4$ on a second terminal $k^5$ when the switch is closed as shown in Fig. 2, and when the trip member $b^2$ is shifted to its upper position, the contacts $k^3$ and $k^4$ are separated.

The switch mechanism is enclosed in a suitable box or casing into which the high-expansion thermostat element extends and is therein connected to the bridge or slide $c$ carrying the contact-stud $c^2$ which is designed to impinge on the lever-heel $a^2$; this bridge being adapted relatively to the lever heel $a^2$ in correspondence with fluctuations of the furnace temperature. The bridge $c$ is slidably mounted on a pair of guide rods $c^3$ crossing the switch-box, and these rods also position a pair of compression springs $d$ that exert a thrust on the bridge and constitute the thermostat loading springs as hereinafter described; these springs being stronger than the switch closing spring $e$ so as to obviate any possibility of the latter exerting a thrust on the active element of the thermostat, or counteracting the tension effect exerted by the loading springs on the said element.

Figure 1:
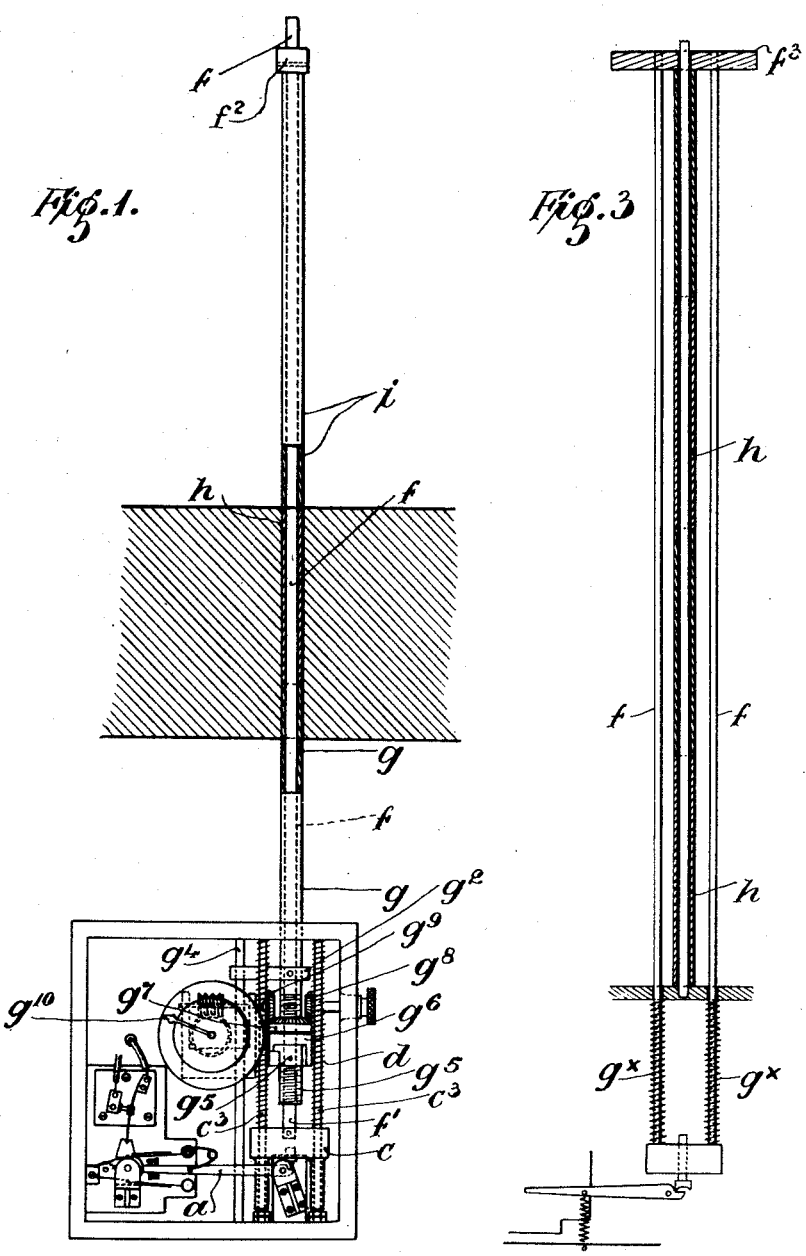
Fig. 1 is a plan view partially in section of an installation constructed in accordance with my invention, and in which a portion of the thermostat is shown extending through a furnace wall.

The structure shown in Fig. 1 comprises an active element $f$ taking the form of a rod of nickel-chromium or other material having a high co-efficient of expansion. This rod is attached at its one extremity $f^1$ to the sliding bridge $c$ in the switch box and proceeds thence through the furnace wall into the working chamber of the furnace, where the extremity remote from the switch box carries a fixed stop or abutment piece $f^2$. Surrounding the switch box end is a sleeve $g$ which is anchored to an adjustable bracket $g^2$ or other fixture inside the switch box and is immovable in relation to the element $f$; this sleeve being preferably made of a material which will expand and contract pro rata with the said element and it is extended from the switch box into an aperture in the furnace wall and into abutment with a second sleeve $h$ which also surrounds the rod $f$ and has the same expansion characteristics as sleeve $g$, whilst the part of the rod $f$ that is located in the furnace working-chamber is surrounded by a third sleeve $i$ which may be regarded as constituting the second element of the thermostat and is made of a heat-resistant material (such as silica) having a very low co-efficient of expansion. This sleeve element $i$ extends from the inner face of the furnace wall up to the abutment stop $f^2$ on the thermostat rod $f$ and is confined between the said stop and the sleeve $h$.

As the switch-box end of the thermostat rod $f$ is mechanically connected to the bridge $c$ that take the direct thrust of the loading springs $d$ and as the furnace end of the said rod bears by the stop $f^2$ on the sleeve elements $i$, $h$ and $g$, it follows that the thrust of the said springs maintains the rod $f$ in tension and that the spring pull transmitted through the said rod acts through the stop $f^2$ to maintain in compression the low compression element that is exposed to the furnace heat, so that although the furnace end of the active thermostat element has no fixed anchorage inside the furnace it is held in abutment with the surrounding element by the loading springs, which also maintain the abutting ends of the sleeves $g$, $h$, $i$ in close contact and assist to eliminate sources of error due to slackness and distortion in the thermostat system. Also the fact that the sleeves $g$, $h$ (respectively located outside the furnace and within the furnace wall) are made of material having the same or similar expansion characteristics as the element $f$ eliminates or safeguards against the possibility of working inaccuracies between the working chamber of the furnace and the other parts wherethrough the active thermostat element passes into connection with the switch control mechanism.

Where the loading springs are applied as in the arrangement now being described, any rise in furnace temperature, by expanding the tensioned thermostat element more than the compression element and correspondingly displacing the contact-bridge in the switch-breaking direction, permits the said springs to expand and follow up the said bridge so that when the bridge-contact impinges on the heel of the switch-lever and encounters the resistance of the switch-closing spring, any tendency on the part of the latter to put the thermostat rod $f$ in compression, or to set up lost motion by displacement of the said rod within and relative to the compression element, is neutralized or compensated for by the said loading springs which maintain the rod $f$ in effective tension when the system is operating to bring about the cutting out of the furnace current. Also when the furnace is cooling down and the contact bridge is being retracted (against the loading springs) by the contraction of the rod to permit of the automatic closing of the switch, the loading-spring effort still maintains the elements $f$, $i$, respectively in tension and compression.

The installation preferably embodies means for adjusting the "cold" position of the bridge contact in relation to the heel of the switch lever for the purpose of setting the system so that it will cut out the furnace current on any predetermined temperature within the working range of the system being attained or exceeded, and this adjustment may be associated with a dial and pointer indicator to facilitate such setting.

Where the thermostat elements are arranged in accordance with the system already described with reference to Figure 1, the setting of the cutting-out action is provided for by so arranging the anchorage bracket $g^2$ and the system of sleeves $g$, $h$, $i$, that they are capable of longitudinal displacement and can impart, when so displaced, a corresponding displacement to the thermostat rod $f$ and contact-bridge $c$ by virtue of sleeve $i$ bearing against the stop-abutment $f^2$. This adjustment of the thermostat elements as a unit in either direction for advancing or retarding the cutting-out action is realized, in the construction shown in Figure 1, by slidably mounting the anchor bracket $g^2$ on a fixed guide-rod $g^4$ and forming on the switch-box end of the sleeve $g$, a screw thread which is engaged by a nut $g^5$ that is rotatably mounted in a fixed or non-sliding housing $g^6$ and is connected to a bevel wheel $g^7$ gearing with a second bevel $g^8$ whose spindle is rotatably housed in the wall of the switch-box and carries an external adjusting knob. When the adjusting knob together with gears $g^7$, $g^8$ and nut $g^5$ are turned the bridge piece $c$ is either elevated or lowered by the engagement of the nut $g^5$ with the threads on the lower end of sleeve $g$, whereby the contact stud $c^2$ is adjusted with relation to the lever heel $a^2$, through the medium of sleeves $g$, $h$ and $i$, abutment piece $f^2$ and rod $f$. By another bevel gear $g^9$, the adjusting mechanism is geared to a pointer $g^{10}$ arranged on the outside of the switch box in conjunction with a suitable scaled dial for giving visible readings or indications to assist the correct setting of the apparatus so that the same will cut out the furnace current when the furnace attains the predetermined temperature as indicated by the dial.

Another alternative construction of the thermostat is shown in Figure 3 in which the active element is constituted by a pair of rods $f$ of nickel-chromium or the like, which are arranged in parallel relationship and are coupled together at the switch-box end by a bridge-piece $c$ that carries the contact for impinging on the heel of the switch lever. From this bridge, the rods proceed through clearance-holes in the side of the switch-box and thence into the furnace or thermostat chamber wherein the said rods are located for the greater part of their length, whilst the extremities remote from the switch-actuating slide are coupled together by a second bridge $f^3$. The low-expansion element of the thermostat consists either of a single tube, or of a series of sleeves or tubes $h$ strung upon a carrier rod $h^2$ and confined between the bridge $f^3$ and some fixed abutment such as the furnace wall. The loading springs $g^x$ are carried on the switch-box ends of the rods $f$ so that they exert a thrust on the bridge $c$ and since the furnace ends of the rods are anchored to the bridge $f^2$, and the bridge bears upon the sleeve $h$, the rods $f$ are held in constant tension and the sleeve $h$ under constant compression by the springs as in the previously described arrangements.

As an alternative to using a high-expansion element in the form of a rod or rods disposed co-axially or in parallel with a tubular low-expansion element, the first-mentioned or active element may consist of a thin tube of nickel-chromium or the like, surrounding a rod that serves as a low-expansion element, which would tend to increase the sensitivity of the regulator due to the fact that the outer element would heat up and cool down before the inner one. The loading springs are arranged to maintain tension on the tubular element, which is suitably connected to rods or the like switch operating contact inside the switch box, whilst the furnace end of the said tubular member is provided with an abutment that bears on the inner or rod member and maintains the latter under compression.

Instead of using a non-metallic material for the low-expansion element, the latter may be made of an alloy having a low co-efficient of expansion at all temperatures.

The specific snap switch is shown in my Patent, 1,728,242, of September 17, 1929.

Having described my invention, what I claim and desire to secure by Letters Patent is:—

1. A temperature control installation for a furnace, comprising a thermostat having a high-expansion element, a displacement switch member outside the furnace connected to one end of said element, a low expansion element connected at one end to the first element within the furnace, and loading spring means associated with the elements to keep the high expansion element under tension and the low expansion element under compression.

2. A temperature control installation for a furnace, comprising a thermostat having a high-expansion element, a spring actuated displacement switch member outside the furnace connected to one end of said element, a low expansion element connected at one end to the first element within the furnace, and loading spring means of greater power than the switch spring associated with the elements to keep the high expansion element under tension and the low expansion element under compression.

3. A temperature control installation for a furnace, comprising a thermostat having a high expansion element, a displacement switch member outside the furnace connected to one end of said element, a low expansion element in the form of a sleeve connected at one end to the first element within the furnace, and loading spring means associated with the elements to keep the high expansion element under tension and the low expansion element under compression.

4. A temperature control installation for a furnace, comprising a thermostat having a high expansion element, a displacement switch member outside the furnace, a bridge member connected to one end of said element and arranged to engage the switch member, a low expansion element connected at one end to the first element within the furnace, and loading spring means associated with the elements to keep the high expansion element under tension and the low expansion element under compression.

5. A temperature control installation for a furnace, comprising a thermostat having a high-expansion element, a displacement switch member outside the furnace connected to one end of said element, a low expansion element connected at one end to the first element within the furnace, loading spring means associated with the elements to keep the high expansion element under tension and the low expansion element under compression, and means for adjusting the connection between the displacement switch member and the high expansion element.

6. A temperature control installation, having a high expansion element and a low expansion element connected to each other at one end, said end being arranged to be located within a chamber in which the temperature is to be controlled, one of said elements being longer than the other and arranged to extend beyond the chamber wall, a switch controlling member connected to the longer element and arranged to move the controlling member, a third expansion element of the same co-efficient of expansion as the longer element associated with the shorter element and arranged to extend beyond the wall of the chamber, and means for anchoring said third element remote from the shorter element.

7. A temperature control installation comprising a thermostat having a high-expansion element and a low-expansion element, a displaceable switch-controlling member connected with the high-expansion element outside the furnace, a locating element made of material having a low or negligible expansion co-efficient abutting the high-expansion element within the furnace, and loading springs for maintaining the locating element in abutment with the high-expansion element, such loading springs being effective for maintaining the high-expansion element in tension and the low-expansion element in compression.

In testimony whereof I have hereunto set my hand.

ALFRED GLYNNE LOBLEY.